UNITED STATES PATENT OFFICE 2,502,478

TETRAFLUOROSUCCINIC ACID DERIVATIVES AND THEIR PREPARATION

John J. Padbury, Stamford, and Edward L. Kropa, Old Greenwich, Conn., assignors to American Cyanamid Company, New York, N. Y., a corporation of Maine No Drawing. Application February 27, 1947, Serial No. 731,422

11 Claims. (Cl. 260—482)

This invention relates to the production of new chemical compounds and more particularly to new and useful fluorine compounds and to methods of preparing the same. Specifically the invention relates to chemical compounds represented by the general formula

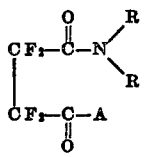

I where R represents a member of the class consisting of hydrogen and monovalent hydrocarbon radicals and A represents one of the following:

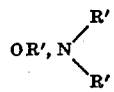

where R' has the same meaning as R. Thus, when A represents OR' the compounds may be represented by the formula

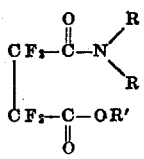

II and when A represents

the compounds may be represented by the formula

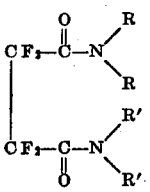

III

In each of the Formulas II and III R and R' each represents a member of the class consisting of hydrogen and monovalent hydrocarbon radicals. The scope of the invention also includes methods of preparing fluorine compounds of the kind embraced by the above formulas.

Illustrative examples of monovalent hydrocarbon radicals which R and R' in the above formulas may represent are: aliphatic (e. g., methyl, ethyl- propyl, isopropyl, butyl (n-butyl), sec.- butyl, tert.-butyl, amyl, isoamyl, hexyl, octyl, decyl, dodecyl, octadecyl, allyl, methallyl, crotyl, oleyl, etc.), including cycloaliphatic (e. g., cyclopentyl, cyclopentenyl, cyclohexyl, cyclohexenyl, cycloheptyl, etc.); aryl (e. g., phenyl, biphenylyl or xenyl, naphthyl, etc.); aliphatic-substituted aryl (e. g., tolyl, xylyl, ethylphenyl, propylphenyl, isopropylphenyl, tert.-butylphenyl, allylphenyl, 2-butenylphenyl, etc.); and aryl-substituted aliphatic (e. g., benzyl, cinnamyl, phenylethyl, phenylpropyl, etc.). In Formula II R is preferably hydrogen and R' is either hydrogen or a saturated aliphatic monovalent hydrocarbon radical (e. g., methyl, ethyl, propyl, butyl, decyl, etc.); while in Formula III R and R' each preferably is hydrogen, in which case the compound is tetrafluorosuccinamide (the diamide of tetrafluorosuccinic acid), the formula for which is

IV

From the above formulas and definitions of R and R' it will be seen that the present invention provides both monoamides and diamides of tetrafluorosuccinic acid, including both unsubstituted and N-hydrocarbon-substituted monoamides and diamides of tetrafluorosuccinic acid, and monoester unsubstituted monoamides and N-hydrocarbon-substituted monoamides of tetrafluorosuccinic acid.

It was suggested prior to our invention that fluoroacetamides, more particularly N-substituted mono- and difluoroacetamides, be prepared by effecting reaction, while admixed with water, between a polyfluoroethylene containing at least three fluorine atoms, e. g., tetrafluoroethylene, and an organic amine having a hydrogen atom attached to the amino grouping thereof. Such compounds contain at the most only two fluorine atoms per molecule and therefore have only limited flame-proofing characteristics. Furthermore, since they are monoamides, their utility as intermediates in the preparation of other fluorinated compounds or compositions also is limited.

It is an object of the present invention to provide a new class of fluorinated compounds.

Another object of the invention is to provide fluorinated compounds which have wide utility as flameproofing agents, plasticizers, insecticides, fungicides and bactericides, or as components of such materials, as pharmaceutical intermediates, as dye intermediates, and as intermediates in the preparation of derivatives thereof such, for instance, as reaction products of an aldehyde, e. g., formaldehyde, with an aldehyde-reactable fluorinated compound of this invention, e. g., tetrafluorosuccinamide.

Another object of the invention is to provide effective and economical processes by which the compounds of this invention may be obtained in a high yield.

Other objects of the invention will be apparent to those skilled in the art from the following more detailed description.

Various methods may be employed in producing the chemical compounds of this invention. For example, a monoamide of tetrafluorosuccinic acid may be prepared by effecting reaction between equal molar amounts of tetrafluorosuccinic anhydride and ammonia or a primary or secondary amine. This reaction is illustrated by the following equation:

V 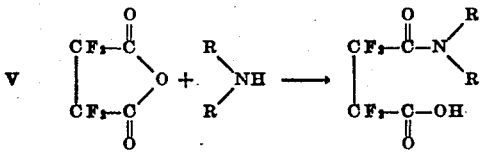

In the above equation R represents hydrogen or a monovalent hydrocarbon radical.

Tetrafluorosuccinic anhydride, which is believed to be a new chemical compound, was produced by several methods:

*Method A.*—A mixture of 47.5 parts of tetrafluorosuccinic acid and 19.1 parts of phosphorus oxychloride was heated under a reflux condenser in an oil bath maintained at 215° C. for 2½ hours. Hydrogen chloride was liberated. The mixture was distilled slowly through a 3-bulb Snyder column; the initial boiling point of 54° C. dropped to 35° C. toward the end of the distillation, the drop in boiling point being accompanied by the liberation of hydrogen chloride. The colorless distillate (35.7 parts) contained chlorine and was subjected to two additional distillations, the product being collected at 54°–48° C., during the third distillation. The drop in boiling point was again accompanied by evolution of hydrogen chloride and the product gave a positive test for chloride. The distillate was boiled under reflux with 2.5 parts of silver carbonate for nine hours, and distilled. Tetrafluorosuccinic anhydride was collected as the fraction boiling at 54.8°–55° C. It was free from chloride, had a refractive index of $n_D^{25}$ 1.3245 and a neutral equivalent of 85.8 (theoretical, 86.0).

*Method B.*—From the alkaline permanganate oxidation of 1,2-dichlorotetrafluoro-1-cyclobutene there was obtained a mixture comprised substantially of potassium tetrafluorosuccinate and potassium chloride. Analysis of this oxidation product showed 16% fluorine, indicating that it contained about 56% of potassium tetrafluorosuccinate. A mixture of 23.4 parts of the crude oxidation product (containing 13.2 parts of pure potassium tetrafluorosuccinate) and 4.5 parts by volume of thionyl chloride was heated under reflux for 24 hours. From the reaction mixture there was distilled 4.5 parts of colorless tetrafluorosuccinic anhydride, boiling point 56° C., neutral equivalent 85.2, corresponding to a 53% yield of tetrafluorosuccinic anhydride.

*Method C.*—A mixture of 23.4 parts of crude potassium tetrafluorosuccinate containing 13.2 parts of the pure salt was heated under reflux with 4.3 parts of phosphorus oxychloride for 6 hours. From the reaction mixture there was distilled 5.2 parts of tetrafluorosuccinic anhydride, boiling point 54°–55° C.

Monoester monoamides may be prepared, for instance, by esterification of tetrafluorosuccinamic acid (monoamide of tetrafluorosuccinic acid) with a monohydric alcohol corresponding to the ester desired. This reaction is illustrated by the following equation:

VI 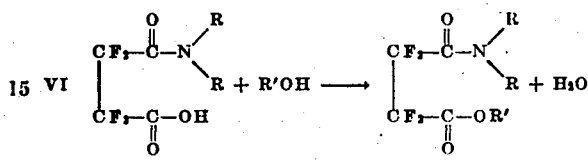

In the above equation R represents hydrogen or a monovalent hydrocarbon radical and R' represents a monovalent hydrocarbon radical. Thus, R'OH may represent, for example, a methyl, ethyl, propyl, butyl, allyl, methallyl, crotyl, benzyl, etc., alcohol.

The diamides of this invention may be prepared by effecting reaction between tetrafluorosuccinyl chloride or bromide and ammonia or a primary or secondary amine. This reaction is illustrated by the following equation:

VII 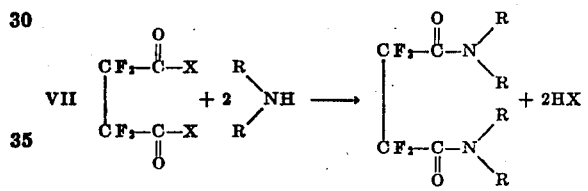

In the above equation X represents chlorine or bromine and R represents hydrogen or a monovalent hydrocarbon radical. Preferably at least about 4 mols of ammonia or of amine are employed, in which case 2 mols of the hydrohalide salt of ammonia or of the amine will be obtained as a by-product of the reaction.

The monoester monoamides and diamides of this invention are preferably prepared by effecting reaction between a diester of tetrafluorosuccinic acid and ammonia or a primary or secondary amine. In the preparation of a monoester monoamide, the reaction is illustrated by the following equation:

VIII 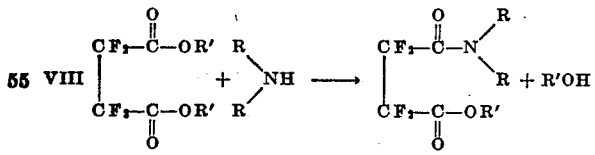

In the preparation of a diamide, the reaction is illustrated by the following equation:

IX

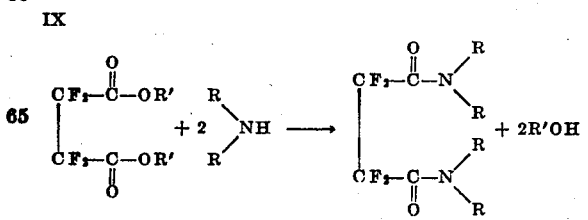

In Equations VIII and IX, R represents hydrogen or a monovalent hydrocarbon radical and R' represents a monovalent hydrocarbon radical. In preparing the monoamides in accordance with the reaction represented by Equation VIII, we prefer to use a diester in which at least one of the ester groupings is a lower alkyl grouping, in which case at least one R' is a lower alkyl (e. g., methyl, ethyl, propyl, butyl, etc.) radical. Similarly, in preparing the diamides in accordance with the reaction represented by Equation IX, we prefer to use a lower alkyl diester, in which case each R' represents a lower alkyl radical.

In carrying out the reactions represented by Equations VIII and IX, the reaction mass in each case will contain both monoamides and diamides. However, when approximately equal molar amounts of reactants are employed as in the reaction represented by Equation VIII, the monoester will be obtained in the larger yield; while in the reaction represented by Equation IX, where at least two mols of ammonia or a primary or secondary amine, e. g., from 2 to 10 or more mols thereof, are used for each mol of the diester, the diamide will be obtained in the larger yield. In both cases, the monoester monoamide and the diamide are isolated from the reaction mass by suitable means, e. g., by crystallization.

Diamides wherein hydrocarbon substituents attached to each amide nitrogen are different may be prepared, for example, by using a mixed secondary amine in an amount corresponding to at least 2 mols thereof per mol of a lower alkyl diester of tetrafluorosuccinic acid.

Diamides wherein substituents attached to each amide nitrogen are different also may be prepared by reacting a lower alkyl diester of tetrafluorosuccinic acid first with ammonia or a primary or secondary amine to form a monoester monoamide and then with a different reactive amino compound. These reactions may be illustrated by the following equations:

X

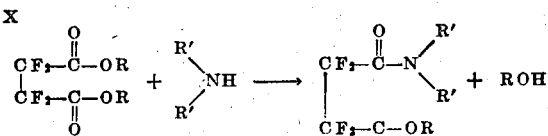

XI

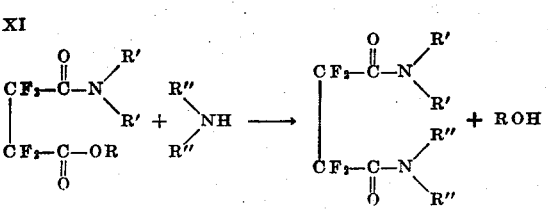

In Equations X and XI, R represents a lower alkyl radical, R' and R" each represents hydrogen or a monovalent hydrocarbon radical except when each R' represents hydrogen, then at least one R" represents a monovalent hydrocarbon radical; or, conversely, when each R" represents hydrogen, then at least one R' represents a monovalent hydrocarbon radical. In cases where the compounds represented by

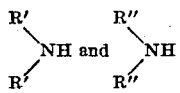

are, in each instance, organic amines, it will be understood, of course, that the amines employed in each reaction are different from each other.

In all of the above preparations, the reaction between the reactants should be effected, for optimum results, at a temperature not substantially exceeding 200° C., since at temperatures much above this point decomposition of the fluorine-containing reactant occurs (especially in the presence of an organic base), as evidenced by severe discoloration and a positive test for fluoride in a water extract of the reaction mass. In some cases the reaction is effected satisfactorily at room temperature (20°–30° C.) or even below room temperature, e. g., 0° to 10° C., while in other cases the reaction proceeds more satisfactorily under heat, e. g., at temperatures within the range of 50° to 150° C.

Depending upon the nature of the products, they may be separated from the reaction mass or from each other if isolated as an admixture by such means as, for example, distillation, extraction or filtration. In some cases the reaction and the separation of the products may be effected in a combined operation; or the reaction and isolation of the products may be effected in separate steps.

Illustrative examples of primary and secondary amines that may be used in carrying out the methods illustrated by Equations V, VII, VIII, IX, X and XI are:

| | |
|---|---|
| Methylamine (monomethylamine) | Methyl propyl amine |
| Dimethylamine | Ethyl propyl amine |
| Ethylamine | Ethyl butyl amine |
| Diethylamine | Allylamine |
| Propylamine | Diallylamine |
| Isopropylamine | Crotylamine |
| Dipropylamine | Cyclohexylamine |
| Diisopropylamine | Cyclohexenylamine |
| Butylamine | Aniline |
| Isobutylamine | N-methylaniline |
| Sec.-butylamine | Toluidine |
| Dibutylamine | N-ethyltoluidine |
| Amylamine | Xylidine |
| Octylamine | Benzylamine |
| Decylamine | Allylphenylamine |
| Octadecylamine | Naphthylamine |
| Methyl ethyl amine | Phenylethylamine |
| | Ethylphenylamine |

In order that those skilled in the art better may understand how the present invention may be carried into effect, the following examples are given by way of illustration and not by way of limitation. All parts are by weight unless otherwise stated.

*Example 1*

Anhydrous ammonia was bubbled through a solution of 100 parts of diethyl tetrafluorosuccinate dissolved in about 264 parts of benzene. A solid comprising tetrafluorosuccinamide precipitated slowly at first and more rapidly as the temperature rose from an initial temperature of 26° C. to 43° C., at which point the reaction vessel was externally cooled to reduce the contents to about 30° C. The reaction was complete in about 3 hours. The precipitated, finely divided solid was filtered off, washed twice with benzene and dried at room temperature. The yield of tetrafluorosuccinamide amounted to 75.4 parts (98.6% of the theoretical), melting point 255°–258° C. with decomposition. A sample of the amide was recrystallized twice from water, washed with a mixture of water and alcohol, and dried for 3 hours at 100° C. The melting point of the dried material was 255°–260° C. with decomposition.

The above reaction may be illustrated by the following equation:

XII

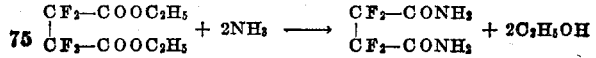

Diethyl tetrafluorosuccinate is prepared, for example, as follows:

| | |
|---|---|
| Tetrafluorosuccinic acid parts | 190.0 |
| Anhydrous ethyl alcohol do | 188.5 |
| Benzene (anhydrous) do | 154.0 |
| Concentrated sulfuric acid (esterification catalyst) drops | 6 |

The above ingredients are heated together at boiling temperature for about 9 hours in a flask holding an 11-plate Brunn column. Attached to the column is a Barrett separating trap with a reflux condenser arranged above the trap. The benzene and excess alcohol are then distilled off until the temperature of the reaction mass reaches 150° C. The Brunn column is replaced by a 6-bulb Snyder column and, after the removal of the last traces of benzene and alcohol, distillation is continued under reduced pressure. Diethyl tetrafluorosuccinate is collected as the fraction boiling at 92°–95° C. (mostly at 92° C.) at 10 mm. mercury pressure. The yield is 229.3 parts or 93.2% of the theoretical. Other esters of tetrafluorosuccinic acid may be similarly prepared.

Tetrafluorosuccinic acid is produced, for example, as follows:

| | Parts |
|---|---|
| 1,2-dichlorotetrafluoro-1-cyclobutene (B. P. 67° C.) | 100 |
| Potassium permanganate | 108 |
| Potassium hydroxide (85% KOH) | 90 |
| Water | 750 |

The potassium permanganate and potassium hydroxide are dissolved in the water, and the resulting solution is heated to 65°–67° C. in a 3-necked reaction vessel provided with a dropping funnel, sealed stirer, internal thermometer and reflux condenser. The 1,2-dichlorotetrafluoro-1-cyclobutene is added over a period of about 45 minutes, which is about as rapidly as the reflux will permit. After adding all of the cyclobutene, the reaction mass is maintained at 65°–70° C. for about 6 hours, or until the permanganate color has been completely discharged. The resulting manganese dioxide is filtered off and washed three times with 75 parts of water each time. To the combined filtrate and washings is added 65 parts by volume of concentrated sulfuric acid, and this acidified solution is continuously extracted for 24 hours with 400 parts by volume of alcohol-free ether. The ether extract is dried over anhydrous calcium chloride. After removal of the ether on the steam bath the residue is distilled under reduced pressure. A fore-run of about 1.8 parts is obtained, after which the distillate begins to solidify. Tetrafluorosuccinic acid is collected as a fraction boiling at 151°–153° C. at 13.8 mm. mercury pressure. When cooled, the product is a white solid with a melting point of 100°–115° C. and a neutral equivalent of 96.2 (theoretical, 95). The yield of crude material is 72 parts or about 74% of the theoretical. After recrystallization from benzene, purified tetrafluorosuccinic acid having a melting point of 116°–119° C. is obtained.

Tetrafluorosuccinic acid may be used as an intermediate in the preparation of tetrafluorosuccinimide, which latter, in turn, may be employed in preparing N-substituted tetrafluorosuccinimides, e. g., N-vinyltetrafluorosuccinimide, N-allyltetrafluorosuccinimide, etc. Such N-unsaturated-hydrocarbon-substituted tetrafluorosuccinimides can be polymerized to yield new and useful polymers.

Example 2

Diethyl tetrafluorosuccinate

| | |
|---|---|
| Diethyl tetrafluorosuccinate parts by weight | 49.2 |
| Concentrated ammonium hydroxide (approx. 28% NH₃) parts by volume | 40.0 |
| Ethyl alcohol do | 100.0 |

To 49.2 parts by weight of diethyl tetrafluorosuccinate dissolved in 100 parts by volume of ethyl alcohol and cooled in an ice bath was added 40 parts by volume of concentrated ammonium hydroxide. A white solid comprising tetrafluorosuccinamide separated immediately and the temperature rose to about 50° C., dropping somewhat in about 5 minutes. After standing at room temperature for 30 minutes, the reaction vessel was cooled in an ice bath, and the tetrafluorosuccinamide was filtered from the cooled reaction mass. The separated amide was washed with alcohol, then twice with water and finally with alcohol, after which it was dried under vacuum. The yield of dried amide was 24.7 parts, which corresponds to 65.7% of the theoretical yield. After recrystallization from water the melting point of the product was 255°–260° C. with decomposition.

A sample of tetrafluorosuccinamide which had been prepared in a manner similar to that described above gave the following results upon analysis:

| | Per cent C | Per cent H | Per cent F |
|---|---|---|---|
| Calculated for $C_4H_4F_4N_2O_2$ | 25.54 | 2.15 | 40.43 |
| Found | 25.76 | 2.32 | 40.46 |
| | 25.81 | 2.27 | 40.59 |
| | | | 40.57 |

Example 3

Tetrafluorosuccinamide was obtained, together with other products, by heating ammonium tetrafluorosuccinate at about 220° to 225° C. The yield of tetrafluorosuccinamide by this method was only about 17%.

Ammonium tetrafluorosuccinate is prepared, for example, by dissolving 38 parts of tetrafluorosuccinic acid in 25 parts of water and slowly adding 40 parts by volume of concentrated ammonium hydroxide to the cooled, agitated solution. Some of the ammonium salt precipitates and may be filtered off if desired. The salt dissolves upon warming the solution, which is alkaline after all of the ammonium hydroxide has been added. The solution may be concentrated by heating to yield ammonium tetrafluorosuccinate, which is then heated as above described to obtain tetrafluorosuccinamide and other products.

Example 4

This example illustrates the preparation of tetrafluorosuccinanilic acid, the formula for which is

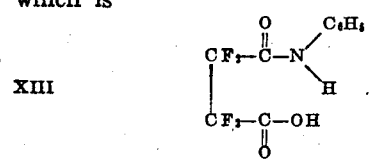

XIII

| | Parts | Approx. Mol Ratio |
|---|---|---|
| Tetrafluorosuccinic anhydride | 12.3 | 1 |
| Aniline | 6.7 | 1 |

To a solution of 12.3 parts of tetrafluorosuccinic anhydride dissolved in about 220 parts of dry benzene was added a solution of 6.7 parts of aniline dissolved in about 88 parts of dry benzene. Some heat was evolved, and after standing for about 2 minutes a white solid comprising tetrafluorosuccinanilic acid separated from the reaction mass. After standing at room temperature (20°–30° C.) for about 16 hours, the precipitated solid was filtered off, washed with benzene, and dried. The yield of dried, crude tetrafluorosuccinanilic acid was 17.5 parts (93% of the theoretical), melting point 102°–110° C.

Example 5

This example illustrates the preparation of N,N'-di-n-butyltetrafluorosuccinamide, the formula for which is

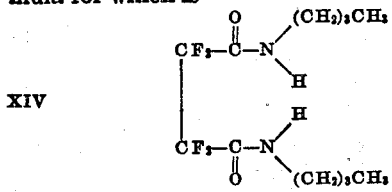

XIV

| | Parts | Approx. Mol Ratio |
|---|---|---|
| Diethyl tetrafluorosuccinate | 24.6 | 1 |
| n-Butylamine | 21.9 | 3 |

To 21.9 parts of n-butylamine dissolved in about 88 parts of benzene was added 24.6 parts of diethyl tetrafluorosuccinate. A solid, white product comprising N,N'-di-n-butyltetrafluorosuccinamide separated from the clear solution after standing at room temperature for a few minutes. The reaction mass was allowed to stand for about 16 hours at room temperature, after which the solid reaction product was filtered off, washed with a small amount of benzene, and dried. The yield of dried, crude N,N'-di-n-butyltetrafluorosuccinamide was 22.8 parts (76% of the theoretical), melting point 130°–132° C.

Example 6

This example illustrates the preparation of N,N'-dioctadecyltetrafluorosuccinamide, the formula for which is

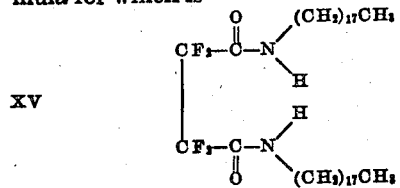

XV

| | Parts | Approx. Mol Ratio |
|---|---|---|
| Diethyl tetrafluorosuccinate | 24.6 | 1 |
| Octadecylamine | 53.9 | 2 |

To 53.9 parts of octadecylamine dissolved in about 220 parts of warm benzene was added 24.6 parts of diethyl tetrafluorosuccinate. The resulting solution was heated under reflux at the boiling temperature of the mass for 30 minutes. The light-colored solid comprising N,N'-dioctadecyltetrafluorosuccinamide which separated upon cooling was filtered off and washed with benzene. After drying, the yield of crude N,N'-dioctadecyltetrafluorosuccinamide was 44.6 parts (64% of the theoretical), melting point 105°–108° C.

Example 7

This example illustrates the preparation of N,N,N',N' - tetraisopropyltetrafluorosuccinamide, the formula for which is

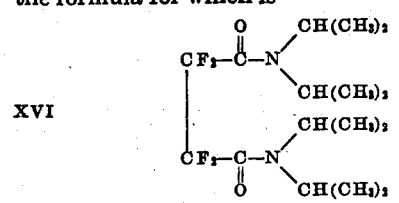

XVI

| | Parts | Approx. Mol Ratio |
|---|---|---|
| Diethyl tetrafluorosuccinate | 24.6 | 1.0 |
| Diisopropylamine | 29.0 | 4.9 |

A mixture of 29 parts of diisopropylamine and 24.6 parts of diethyl tetrafluorosuccinate was heated under reflux at the boiling temperature of the mass for 8 hours. After removal of excess diisopropylamine and unreacted diethyl tetrafluorosuccinate by distillation, 3.5 parts of a light-colored solid comprising crude N,N,N',N'-tetraisopropyltetrafluorosuccinamide was obtained.

Example 8

This example illustrates the preparation of tetrafluorosuccinanilide, the formula for which is

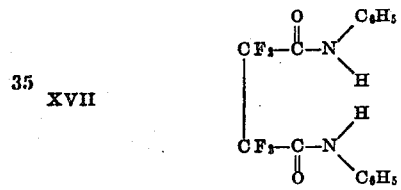

XVII

| | Parts | Approx. Mol Ratio |
|---|---|---|
| Tetrafluorosuccinyl chloride | 60.0 | 1 |
| Aniline | 99.0 | 4 |

A solution of 60 parts of tetrafluorosuccinyl chloride dissolved in about 440 parts of dry benzene was added slowly to a cooled solution of 99 parts of aniline dissolved in about 880 parts of dry benzene. A light-yellow solid comprising tetrafluorosuccinanilide separated. The reaction mass was warmed on a steam bath for a few minutes, cooled, and the solid filtered off. The isolated product was triturated with 1000 parts of water to dissolve the aniline hydrochloride. The remaining solid comprising tetrafluorosuccinanilide was filtered off and was washed with a small amount of alcohol. The dried tetrafluorosuccinanilide melted at 220°–225° C.

The method of this example is illustrated by the following equation:

XVIII

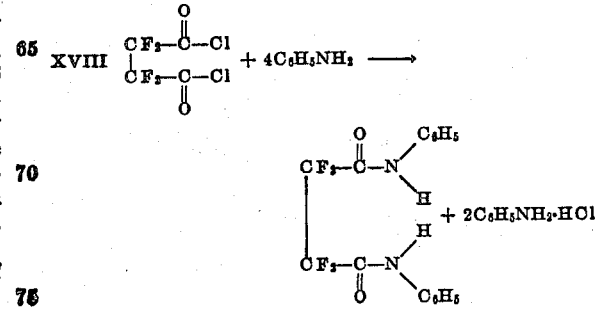

Tetrafluorosuccinyl chloride was prepared as follows:

| | Approx. mol ratio |
|---|---|
| Tetrafluorosuccinic acid, 171 parts by wt | 1.0 |
| Phosphorus trichloride, 165 parts by wt | 1.33 |
| p-Cymene, 250 parts by vol. | |

A mixture of 171 parts by weight of tetrafluorosuccinic acid, 165 parts by weight of phosphorus trichloride and 250 parts by volume of a solvent, more particularly purified p-cymene, was heated under reflux in a reaction vessel provided with a reflux condenser which was protected by a drying tube. Hydrogen chloride was evolved, and the solid gradually dissolved. Heating under reflux was continued for 24 hours, at the end of which period of time the reaction appeared to be complete. The reaction vessel was fitted with a short fractionating column, and the crude tetrafluorosuccinyl chloride was distilled from the solvent and the inorganic by-product of the reaction. Redistillation of the crude product yielded 127 parts of tetrafluorosuccinyl chloride, which corresponded to 62% of the theoretical yield. The boiling point of this material was 50°–51° C., and its refractive index was 1.3650 at 25° C.

The above reaction is illustrated by the following equation:

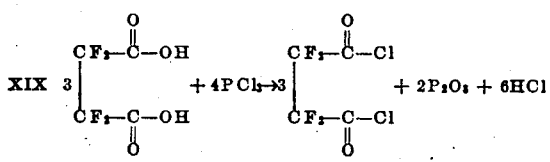

Example 9

This example illustrates the preparation of a monoester monoamide of tetrafluorosuccinic acid, more particularly ethyl N-n-butyltetrafluorosuccinamate, the formula for which is

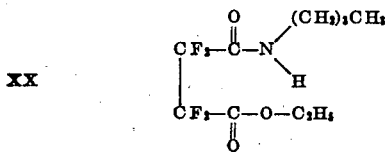

| | Parts | Approx. Mol Ratio |
|---|---|---|
| Diethyl tetrafluorosuccinate | 24.6 | 1 |
| n-Butylamine | 7.3 | 1 |

A solution of 24.6 parts of diethyl tetrafluorosuccinate dissolved in about 88 parts of benzene was added slowly to 7.3 parts of n-butylamine. A solid precipitated from the clear solution after standing for a few minutes. After standing for about 16 hours at room temperature, 5 parts of N,N'-di-n-butyltetrafluorosuccinamide was removed by filtration. The filtrate was evaporated under reduced pressure to yield a solid residue comprising ethyl N-n-butyltetrafluorosuccinamate.

Other fluorine compounds closely related to compounds of the kind embraced by Formula I also may be prepared, for example, compounds represented by a formula such as Formula III but wherein the substituents attached to the amido nitrogen, which substituents are represented by R and R' in Formula III, are substituted hydrocarbon radicals, for instance, halogeno-substituted (e. g., chloro-, bromo- or fluorosubstituted) hydrocarbon radicals, hydroxy-substituted hydrocarbon radicals, etc. The preparation of such compounds is illustrated by the following example:

Example 10

This example illustrates the preparation of N,N'-bis-(β-hydroxyethyl)-tetrafluorosuccinamide, the formula for which is

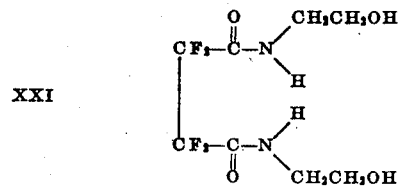

| | Parts | Approx. Mol Ratio |
|---|---|---|
| Diethyl tetrafluorosuccinate | 24.6 | 1 |
| Ethanolamine | 12.2 | 2 |

To 12.2 parts of ethanolamine (monoethanolamine) was added a solution of 24.6 parts of diethyl tetrafluorosuccinate dissolved in about 44 parts of benzene. The reaction mass was heated on a steam bath for 5 minutes, and was then allowed to stand at room temperature for about 16 hours. The white, solid product comprising N,N'-bis-(β-hydroxyethyl)-tetrafluorosuccinamide that precipitated was filtered off, washed with benzene, and dried. The yield of dried, crude N,N'-bis-(β-hydroxyethyl)-tetrafluorosuccinamide was 25.6 parts (93% of the theoretical), melting point 142°–148° C.

Instead of ethanolamine, other primary or secondary alkanolamines may be employed, e. g., diethanolamine, isopropanolamine, ethyl ethanolamine, phenyl ethanolamine, propyl ethanolamine, etc. Also various alkylenepolyamines may be reacted with a diester of tetrafluorosuccinic acid. For example, we may react ethylenediamine and diethyl tetrafluorosuccinate in the ratio of at least 2 mols of the former to 1 mol of the latter to obtain N,N'-bis-(β-aminoethyl)-tetrafluorosuccinamide, the formula for which is

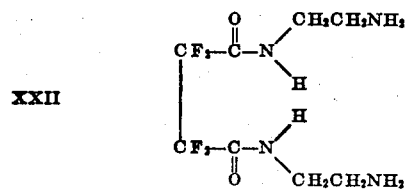

We may also react various alkyleneimines with a diester of tetrafluorosuccinic acid. For instance, we may react ethyleneimine and diethyl tetrafluorosuccinate in the ratio of at least 2 mols of the former to 1 mol of the latter to obtain N,N,N',N'-diethylenetetrafluorosuccinamide, the formula for which is

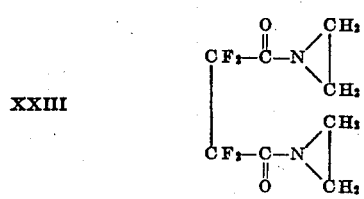

Instead of ethyleneimine, tetrahydropyrrole (tetramethyleneimine) similarly may be reacted with a diester of tetrafluorosuccinic acid to obtain N,N,N',N'-dibutylenetetrafluorosuccinamide, the formula for which is XXIV 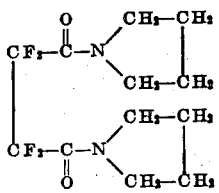

Similarly, halogeno-substituted aliphatic or aromatic amines may be used in methods such as hereinbefore described to obtain compounds wherein the amide grouping contains a halogenated aliphatic or aromatic radical. Illustrative examples of amines that may be employed in making such compounds are the fluorinated ethylamines (e. g., mono-, di- and trifluoroethylamines), the chlorinated and fluorinated anilines (e. g., dichloroaniline, trifluoroaniline, etc.), the fluorinated toluidines (e. g., trifluorotoluidine, etc.), the fluorinated xylidenes (e. g., hexafluoroxylidene, etc.).

Illustrative examples of other compounds embraced by Formula I in addition to those shown in Examples 1 to 9, inclusive, that may be produced in accordance with the present invention are:

N-methyltetrafluorosuccinamic acid (N-methyl monoamide of tetrafluorosuccinic acid)
N,N-dimethyltetrafluorosuccinamic acid (N,N-dimethyl monoamide of tetrafluorosuccinic acid)
N-ethyltetrafluorosuccinamic acid (N-ethyl monoamide of tetrafluorosuccinic acid)
N-allyltetrafluorosuccinamic acid (N-allyl monoamide of tetrafluorosuccinic acid)
N-phenyltetrafluorosuccinamic acid (N-phenyl monoamide of tetrafluorosuccinic acid)
N,N-dipropyltetrafluorosuccinamic acid (N,N-dipropyl monoamide of tetrafluorosuccinic acid)
sym.-Dimethyltetrafluorosuccinamide
N,N'-tetramethyltetrafluorosuccinamide
as.-Diethyltetrafluorosuccinamide
sym.-Diallyltetrafluorosuccinamide
sym.-Diphenyltetrafluorosuccinamide
N,N - dimethyl - N',N' - diethyltetrafluorosuccinamide
as.-Dibenzyltetrafluorosuccinamide
sym.-Dicyclohexyltetrafluorosuccinamide
as.-Dipropyltetrofluorosuccinamide
sym.-Dibutyltetrafluorosuccinamide
sym.-Dipentyltetrafluorosuccinamide
sym.-Dioctyltetrafluorosuccinamide
sym.-Didecyltetrafluorosuccinamide
Methyl tetrafluorosuccinamate (methyl amidotetrafluorosuccinate)
Ethyl N-methyltetrafluorosuccinamate (ethyl N-methylamidotetrafluorosuccinate)
Propyl N-methyl-N-ethyltetrafluorosuccinamate
Phenyl tetrafluorosuccinamate
Crotyl N-ethyl-N-phenyltetrafluorosuccinamate
Butyl N-ethyltetrafluorosuccinamate
Octyl tetrafluorosuccinamate
Decyl N,N-dimethyltetrafluorosuccinamate
Allyl tetrafluorosuccinamate
Benzyl N-cyclohexyltetrafluorosuccinamate
Amyl N,N-diethyltetrafluorosuccinamate
Octadecyl tetrafluorosuccinamate
Cyclohexyl N,N-dipropyltetrafluorosuccinamate
Hexyl N-phenyltetrafluorosuccinamate
Dodecyl N,N-diphenyltetrafluorosuccinamate The products of this invention have a wide variety of commercial applications. They may be used as flameproofing agents, plasticizers, insecticides, fungicides, bactericides, etc., or as components of such materials. They also constitute a valuable class of intermediates for the preparation of various derivatives which are useful in such applications as mentioned above, and for other purposes, e. g., as dye intermediates, pharmaceutical intermediates, etc. The compounds of this invention which contain at least one hydrogen atom attached to a nitrogen atom of an amide grouping are especially suitable for use as a reactant with an aldehyde, e. g., formaldehyde, in preparing new and useful fluorine-containing compounds and resinous and other compositions as more fully described and claimed in our co-pending application Serial No. 731,423 filed concurrently herewith.

We claim:

1. An amide of the class of amides represented by the general formulas

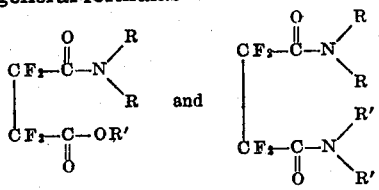

where R and R' each represents a member of the class consisting of hydrogen and monovalent hydrocarbon radicals.

2. A monoamide of tetrafluorosuccinic acid in which at least one of the substituents attached to the nitrogen atom of the amide grouping is a monovalent hydrocarbon radical.

3. Tetrafluorosuccinanilic acid.

4. A monoester monoamide of tetrafluorosuccinic acid in which the hydrocarbon radical of the ester grouping is unsubstituted and at least one of the substituents attached to the nitrogen atom of the amide grouping is a monovalent hydrocarbon radical.

5. Ethyl N-n-butyltetrafluorosuccinamate.

6. Tetrafluorosuccinamide.

7. The method of preparing a compound represented by the general formula

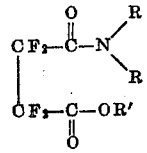

where R represents a member of the class consisting of hydrogen and monovalent hydrocarbon radicals and R' represents a monovalent hydrocarbon radical, said method comprising effecting reaction at a temperature not exceeding substantially 200° C. between approximately equal molar proportions of (1) a compound represented by the general formula

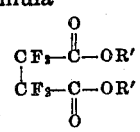

where R' represents a monovalent hydrocarbon radical and (2) a compound represented by the general formula

where R represents a member of the class consisting of hydrogen and monovalent hydrocarbon radicals, and isolating a compound represented by the first-mentioned formula from the resulting reaction mass.

8. The method of preparing a compound represented by the general formula

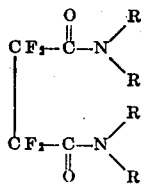

where R represents a member of the class consisting of hydrogen and monovalent hydrocarbon radicals, said method comprising effecting reaction at a temperature not exceeding substantially 200° C. between (1) a compound represented by the general formula

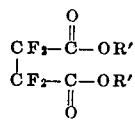

where R' represents a lower alkyl radical and (2) a compound represented by the general formula

where R represents a member of the class consisting of hydrogen and monovalent hydrocarbon radicals, the reactants of (1) and (2) being employed in a molar ratio corresponding to at least two mols of the compound of (2) per mol of the compound of (1), and isolating a compound represented by the first-given formula from the resulting reaction mass.

9. The method of preparing tetrafluorosuccinamide which comprises effecting reaction at a temperature not exceeding substantially 200° C. between (1) diethyl tetrafluorosuccinate and (2) ammonia in the ratio of at least two mols of the compound of (2) per mol of the compound of (1), and isolating tetrafluorosuccinamide from the resulting reaction mass.

10. The method of preparing tetrafluorosuccinamide which comprises adding concentrated ammonium hydroxide containing approximately 28% NH₃ to a solution of diethyl tetrafluorosuccinate dissolved in ethyl alcohol while cooling the said solution in an ice bath, the diethyl tetrafluorosuccinate and ammonium hydroxide being employed in amounts such that there is present in the reaction mass at least two mols of NH₃ per mol of diethyl tetrafluorosuccinate, preventing the reaction mass from rising above about 50° C. during the reaction period, and isolating and purifying the tetrafluorosuccinamide that results from the reaction.

11. The method of preparing tetrafluorosuccinamide which comprises adding 40 parts by volume of concentrated ammonium hydroxide containing approximately 28% NH₃ to a solution of about 49 parts by weight of diethyl tetrafluorosuccinate dissolved in 100 parts by volume of ethyl alcohol while cooling the said solution in an ice bath, preventing the reaction mass from rising above about 50° C. during the initial reaction period, then allowing the reaction mass to remain undisturbed at room temperature for a period of the order of 30 minutes, thereafter cooling the reaction mass in an ice bath, filtering the solid reaction product comprising crude tetrafluorosuccinamide from the cooled reaction mass, washing the isolated crude tetrafluorosuccinamide first with alcohol, then with water and finally with alcohol, and drying the purified tetrafluorosuccinamide under vacuum.

JOHN J. PADBURY.
EDWARD L. KROPA.

REFERENCES CITED

The following references are of record in the file of this patent:

UNITED STATES PATENTS

| Number | Name | Date |
| --- | --- | --- |
| 2,101,323 | Salzberg | Dec. 7, 1937 |
| 2,351,602 | D'Alelio | June 20, 1944 |
| 2,426,224 | Kharasch | Aug. 26, 1947 |

OTHER REFERENCES

Guye, "Jour. de Chimie Physique," vol. 17 (1919), p. 23.

Kharasch et al., "J. Org. Chem.," vol. 10 (1945), pp. 394 to 400.

McBee, paper presented 110th Meeting Am. Chem. Soc., Sept. 12, 1946 (page 441).